Dec. 19, 1933.   K. FASSNACHT ET AL   1,939,806
PROCESS FOR MAKING A CHAIN STRUCTURE
Filed March 23, 1932   3 Sheets-Sheet 1
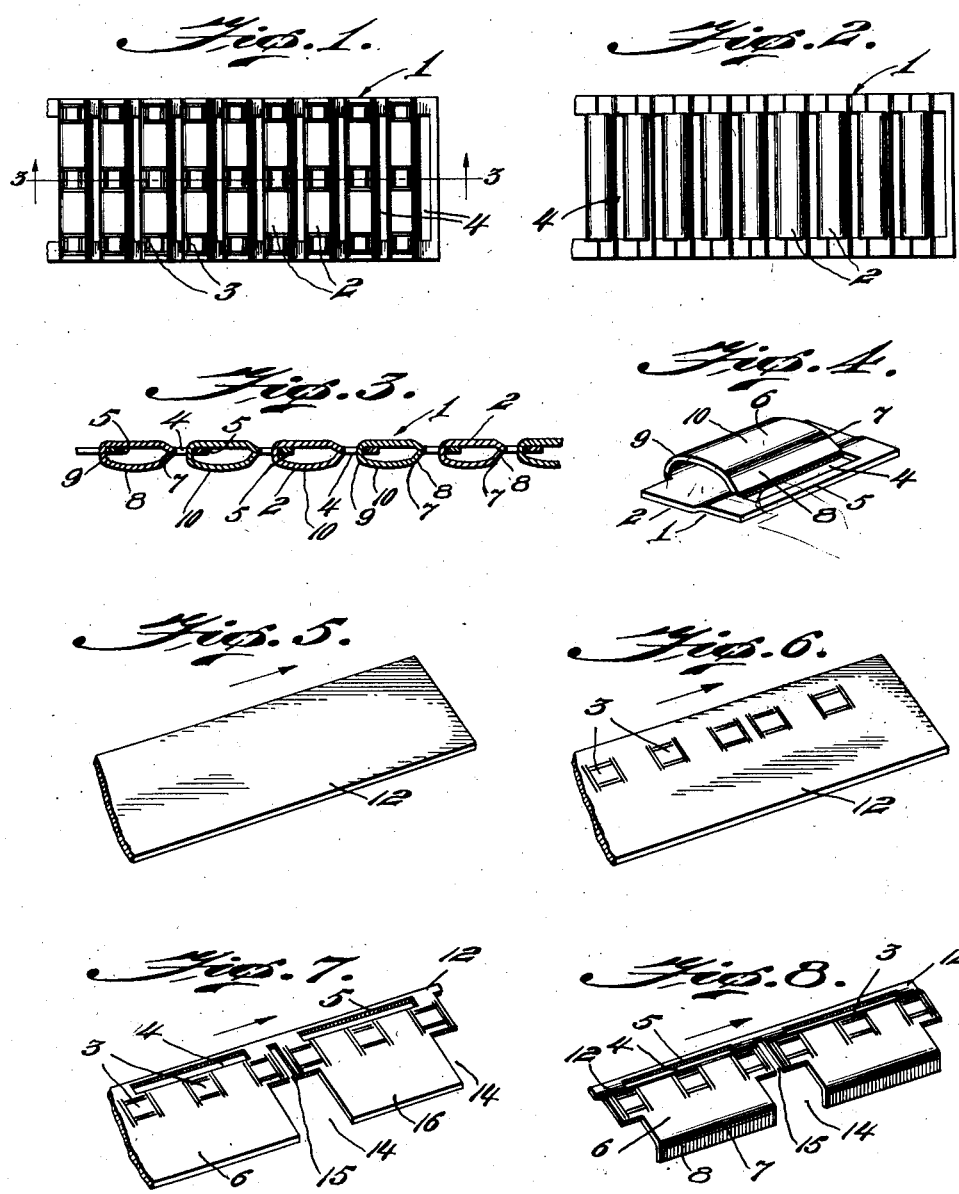

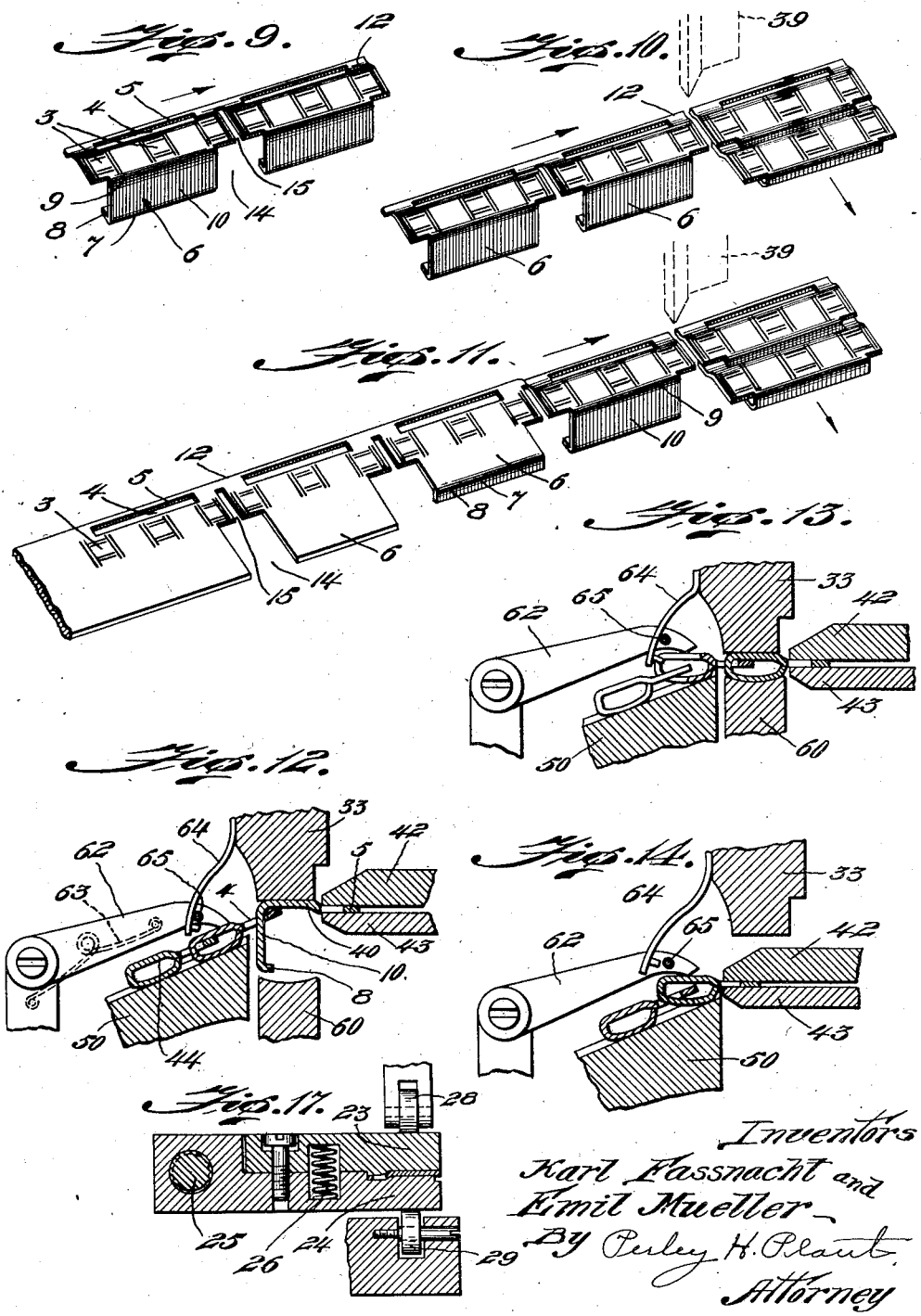

Dec. 19, 1933.  K. FASSNACHT ET AL  1,939,806
PROCESS FOR MAKING A CHAIN STRUCTURE
Filed March 23, 1932  3 Sheets-Sheet 3
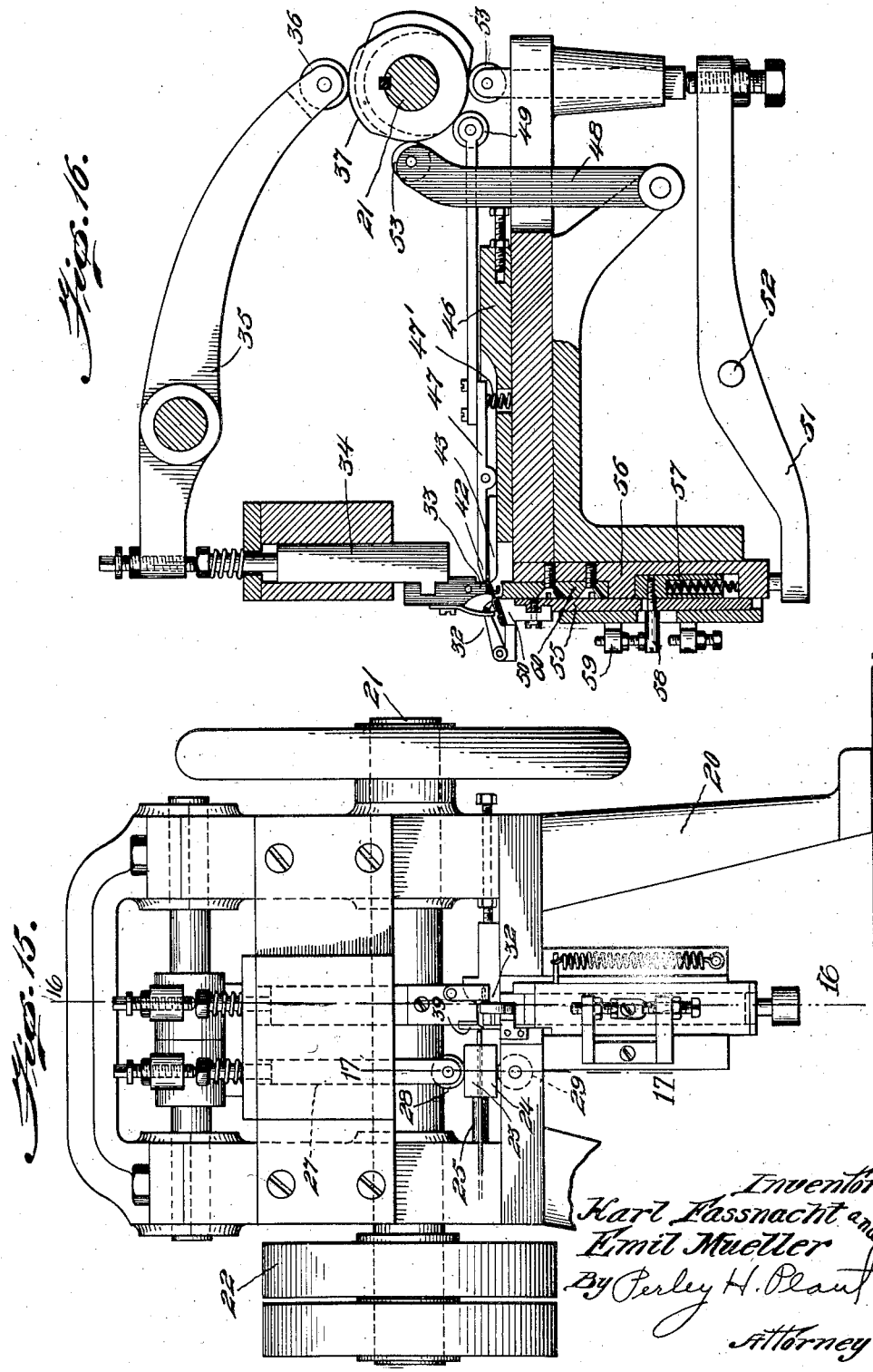

Patented Dec. 19, 1933

1,939,806

UNITED STATES PATENT OFFICE 1,939,806

PROCESS FOR MAKING A CHAIN STRUCTURE

Karl Fassnacht, Providence, and Emil Mueller, Cranston, R. I., assignors to Speidel Chain Company, Providence, R. I., a copartnership consisting of Frederick Speidel and Eugene Speidel, both of Pforzheim, Germany Application March 23, 1932. Serial No. 600,608

19 Claims. (Cl. 59—35)

This invention relates to an improved chain structure and method of making the same, and more particularly to a chain structure comprising a plurality of links formed from relatively thin sheet metal stock and each having an end portion of less width than the major portion of the link bent over after insertion within an opening formed in the end of the next succeeding link to provide a plurality of similar link members joined together in the form of a chain.

One object of the invention is the provision of a simple and easily constructed chain structure in which the separate links are formed of thin material and so connected together as to provide a thin flexible chain structure in which portions of the links may be provided with surface ornamentation to form a continuous design.

A further object of the invention is the provision of novel steps and combinations of steps in the formation of a structure of this character whereby the link elements may be readily formed through a succession of operations and connected together in such a manner as to make the construction of the completed chain a relatively rapid operation capable of being carried out in such a manner as to lend itself readily to mass production.

Another object of the invention is the provision of certain novel steps and combinations of steps in the formation of a chain link of this character which may, if desired, be so arranged as to be capable of being carried out by a single machine having a suitably arranged series of tools capable of being actuated successively to shape properly the several link members in sequence and finally effect the connection of adjacent link members to form a completed chain structure.

Another object of the invention is to provide novel arrangements of the steps in the formation of the link members whereby the link parts may be shaped prior to their separation from the metal blank in such a manner as to permit the separate link elements being readily joined together to form the chain with a minimum manipulation of the formed links after their separation from the blank.

Another object of the invention is the provision of novel steps and arrangements of steps in the formation of the link elements from the blank whereby upon the completion of the link elements prior to their separation from the blank the several parts are so shaped and positioned as to be capable of being readily attached together as a continuous step in the chain forming operation.

Other objects of the invention relate to various improved details of construction and novel steps and arrangements of steps in the formation of the link and chain structure as will be more fully set forth in the detailed description to follow.

Referring to the drawings:—

Fig. 1 is an enlarged front elevational view of a portion of the chain structure showing a plurality of links in connected position, Fig. 2 is an enlarged rear elevational view of the chain structure showing more clearly the manner of connecting the links together, Fig. 3 is an enlarged longitudinal sectional view taken through a portion of the chain and showing the arrangement of the bent over link portions connecting the links together.

Fig. 4 is an enlarged inverted perspective view of one of the links,

Fig. 5 is a detail perspective view of a strip of metal stock such as may be employed in the formation of the chain structure.

Fig. 6 is a detail perspective view of a strip of the metal stock after the application thereto of surface ornamentation such as may be employed as one step in the formation of the chain structure, Fig. 7 is a detail perspective view of the metal strip after it has been subjected to the piercing and cutting operations for forming a slot or opening in each link and cutting away a portion of the stock to form a connecting end portion, Fig. 8 is a detail perspective view of the metal strip after the formation of the first bend in the end edge of the connecting end, Fig. 9 is a detail perspective view of the metal strip after the formation of the second bend which serves to define one edge of the completed link, Fig. 10 is a perspective view illustrating one position of the parts in severing the partially completed link members from the metal strip and connecting the same together by a continuous operation, Fig. 11 is a detail perspective view of a metal strip showing the progressive action of the several steps in sequence, such as would result from carrying out the several steps by means of a completely organized machine unit having parts capable of performing the various forming and shaping operations successively and in sequence, Fig. 12 is a sectional view on a somewhat enlarged scale illustrating one position of the link parts in the carrying out of the link connecting operation, Fig. 13 is a sectional view through a portion of the chain and illustrating one form of mechanism which may be employed in completing the bending operation after the connection is made between adjacent links, Fig. 14 is a view similar to Figs. 12 and 13, illustrating the final step in the completion of the link joining operation and the advancement of the completed chain preparatory to connecting the next succeeding link, Fig. 15 is a front elevational view of one form of mechanism which may be employed for severing the link members, shaped as shown in Fig. 9, and linking the same together to form the completed chain, Fig. 16 is a vertical sectional view, taken substantially along the line 16—16 of Fig. 15, and illustrating more clearly the means for operating the various link forming mechanisms, and Fig. 17 is a vertical sectional view, taken substantially along the line 17—17 of Fig. 15 and showing more clearly the detailed construction of the intermittent feed mechanism.

In the form of chain structure shown herein, each link 1 is formed from relatively thin sheet material and comprises a rectangular body portion 2 having stamped or engraved portions 3 formed thereon and so arranged as to combine with the ornamental portions of the other links to form a continuous design.

Each link 1 is provided with an opening or narrow slot 4 located adjacent to one side edge of the link and forming a narrow metal strip 5 integral with the main body portion 2 of the link. The slot 4 in each link is adapted to receive a tongue 6 carried by the link next adjacent thereto, which tongue is of less width than the main body portion 2 of the link and is bent to encircle the narrow strip 5 of the link next adjacent thereto in securing adjacent links together. The tongue 6 has a bend 7 formed therein and located adjacent its free end which constitutes an inbent end portion 8 adapted to substantially engage the rear face of the body portion 2 of the link to hold the links against separation. Each tongue 6 has a second bend 9 formed therein which is located within the slot 4 and normally engages the metal strip 5 of the next adjacent link, and an intermediate portion 10 positioned between the bends 7 and 9, which is located rearwardly of the main body portion 2 of the link and may be substantially parallel therewith when the links are connected together.

By this construction the body portion 2 of each link is made of substantially thin stock and the several links are hingedly connected to each other to form a flexible chain structure of relatively thin construction wherein the links move freely relative to each other and are adapted to lie flatly against the surface upon which the chain rests.

The chain structure above described may be formed from continuous sheet metal stock in the form of separate strips or a continuous strip by having the strip or strips subjected successively to stamping, cutting, forming, shaping and linking operations, which may be performed by subjecting the strip to the successive operation of each one of several dies or punches, operated either manually or by mechanical means, and so arranged and operated as to involve the use of separate unconnected mechanisms; or the several stamping, cutting, piercing, banding and shaping operations may be performed partially simultaneously and partially by the successive operation of tools, operable either manually or mechanically, through certain of the tools being so constructed as to perform two or more of the operating steps simultaneously, the several simple or compound tools acting upon the strip successively and in any appropriate order; or the chain may be formed by subjecting a continuous sheet metal strip successively to the operation of the stamping, cutting, shaping and linking tools or mechanisms continuously by passing the same through a machine in which the several stamping, cutting, shaping and linking mechanisms are arranged in successive order and cooperate together to effect the formation of the chain structure by a single organized mechanism, which may be entirely automatic in its operation.

In carrying out the several operations of forming the chain structure by means of separately operated stamping, cutting, shaping and linking mechanisms, the sheet metal stock may be treated in the form of strips, wherein each strip is subjected to the operation of the stamping, cutting and shaping tools, each separately, and throughout the entire length of the strip to produce a finished blank of such form as to permit the links to be cut therefrom and attached together either manually or by means of a suitable automatic or semi-automatic mechanism, after the manner indicated in Figs. 5 to 10 inclusive of the drawings.

As shown in Figs. 5 to 9 inclusive, of the drawings, a sheet metal strip 12 is subjected to a series of operations by means of dies or punches, operated either manually or mechanically, to form the ornamental stampings 3, as shown in Fig. 6; to pierce the slots 4 and cut away a portion of the material as indicated at 14 to form portions corresponding with the tongues 6 of the separate links and provide lateral indents 15 partially separating the links from each other, as shown in Fig. 7 of the drawings; to form the bends 7 in the tongues 6 and bend the end portion 8 of each tongue into a plane at substantially right angles to the plane of the strip 12, as shown in Fig. 8 of the drawings; and to form a bend 9 in each tongue and force the intermediate portion 10 of the link into a position at substantially right angles to the main body portion 2 of the link.

After the strip 12 has been subjected successively to the operations above described it assumes the form shown in Fig. 9 of the drawings wherein the strip is shaped to form a series of partially separated link members capable of being completely separated from each other and finally shaped and connected together to form the complete chain structure, after the manner indicated in Fig. 10 of the drawings.

Another blank illustrating the appearance of a sheet metal strip wherein the operations above described have been performed by means of a series of successively arranged stamping, cutting and forming tools operating upon the strip in sequence is shown in Fig. 11 of the drawings wherein the material of each link is shaped successively by continuous sequential operations to form a link blank similar in all respects to those shown in Fig. 9, and which is in readiness for the final operation of severing and connecting the link with a series of previously connected links forming a continuous chain.

One form of mechanism adapted for the purpose of severing the completed links from the blank 12, formed as previously described, is shown in Figs. 15 and 16 of the drawings and comprises a supporting frame 20 provided with an operating shaft 21 adapted to be driven from a drive pulley 22 in the usual manner. An intermittent feed mechanism comprising jaws 23 and 24 movable transversely by means of a shaft 25, which is driven in any suitable manner from the driven shaft 21, are provided with suitable spring means 26 for holding the jaws in open position, and are brought into closed position by means of a suitable cam operated plunger 27 (adapted to be actuated by means of a cam not shown) and provided with a roll 28 engaging the jaw 23 and cooperating with a roll 29 in engagement with the jaw 24 for permitting movement of the feed jaws 23 and 24 from left to right as shown in Fig. 15 of the drawings.

A link shaping and connecting mechanism, indicated generally by the reference character 32, is located at the right of the intermittent feed mechanism, as seen in Fig. 15 of the drawings, and comprises a vertically movable link supporting member 33 which is adapted to be actuated by means of a vertical slide 34 through a rocking arm 35 which has a roll 36 contacting with a cam 37 carried by the operating shaft 21. A cutting tool 39 may be independently actuated or may be carried by the member 33 for severing the link last formed from the metal strip prior to the connection of the link with a previously severed link in forming the chain structure.

The metal strip as shown in Fig. 10 of the drawings may be advanced by the intermittent feed mechanism to bring the end link 40 of the strip beneath the supporting member 33 and into the position as shown in Fig. 12 of the drawings, where the edge portion 5 of the link will be gripped and held between movable jaws 42 and 43 forming part of a mechanism for moving the completed chain 44 in a direction transversely of the path of movement of the metal strip 12 as fed into the machine by the intermittent feed mechanism. The transverse feed mechanism comprises a plate 46 which carries the gripping jaw 43 as well as a pivotally mounted rocker arm 47, the end of which serves to form the gripping jaw 42. The plate 46 is moved transversely of the frame by means of a rocker arm 48 actuated by a suitable cam carried by the operating shaft 21, and the pivotally mounted rocker arm 47 is actuated by a spring 47' to cause the gripping jaw 42 to move towards the jaw 43 and grip the edge portion of the link and is released by means of a roll 49 contacting with a suitable cam mounted upon the operating shaft.

When the link 40 last severed or about to be severed from the strip is held in position by the jaws 42 and 43, as shown in Fig. 12 of the drawings a vertically movable supporting slide 50 carrying the completed chain 44 is raised into the position shown in Fig. 12 of the drawings by means of the rocker arm 51, pivotally mounted at 52 and actuated by a suitable cam carried by the operating shaft 21 through a roll 53, to cause the vertical portion 10 of the link 40 to enter the slot 4 in the last completed link of the chain and bring the parts of the links into the position shown in Fig. 12 of the drawings. The supporting slide 50 is carried by a plate 55 resiliently supported in a vertical slide 56 by means of a coiled spring 57, and carries a stop 58 engageable with a stop 59 supported by a portion of the machine frame for limiting the upward movement of the supporting slide 50. Upon the completion of the upward movement of the supporting slide 50, further movement of the rocker arm 51 about its pivot 52 will move the vertical slide 56 upwardly relative to the supporting slide 50 and will cause the former member 60, carried by the vertical slide 56 to move upwardly into the position shown in Fig. 13 of the drawings to bend the portion 10 of the link 40 upwardly into position to bring the inbent end portion 8 of the link into substantial engagement with the main body portion thereof for closing the link and forming the last link of the completed chain, as shown in Fig. 13 of the drawings.

A pivotally mounted pawl 62 is acted upon by a spring 63 to hold the completed chain against the supporting surface of the inclined support 50 during the operation of connecting the link last severed to the previously severed link, and the pawl 62 is further held in its chain engaging position by means of an arm 64 carried by the link supporting member 33 and engaging a pin 65 carried by the pawl 62 for holding the pawl closely against the formed chain during the link forming operation as shown in Figs. 12 and 13 of the drawings.

After the completion of the link forming operation, as shown in Figs. 12 and 13 of the drawings, the plate 46 is moved transversely of the frame through actuation of the rocker arm 48, and at the same time the link supporting member 33 is raised as shown in Fig. 14 of the drawings, whereby the completed chain is moved over to the inclined face of the supporting slide 50 and into position to receive the next successive link. As the member 33 is raised the arm 64 is moved out of engagement with the pin 65 to permit the pawl 62 to move upwardly against the tension of the spring 63 and slide over upon the link last added to the chain and into position to support this link upon the inclined slide 50, as shown in Fig. 12 of the drawings. After the plate 46 is moved as above described for transferring the newly formed chain link to the inclined support 50, the jaws 42 and 43 open through movement of the pivotally mounted rocker arm 47, and the plate 46 is then returned to its initial position as shown in Fig. 12 of the drawings with the jaws 42 and 43 separated to receive the edge portion of the link member last formed for attachment to the chain as previously described.

While the metal strip may be formed and shaped as shown in Fig. 9 of the drawings by means of any suitable cutting and shaping tools, operated either separately or in any desired sequence, the blank thus formed may be operated upon by mechanism similar to that shown in Figs. 15 and 16 of the drawings, after the manner previously described, to connect the several links together for forming the completed chain structure.

As an alternative method of procedure, the thin metal strip from which the chain structure is formed and may be fed into a completely organized and automatically operated mechanism, such, for example, as that shown in the copending application Serial No. 537642, filed May 15, 1931, for forming the link members through successive and progressive steps into a shape similar to that shown in Fig. 11 of the drawings, and for severing and connecting the completed link members by the mechanism shown and described in that application.

The stamping, shaping, piercing and bending operations may also be performed upon the sheet metal strip to form the link members within the stock, that is, with a narrow marginal strip of the stock surrounding each link element, in such a manner that the separate link members may be connected to the metal strip from which they are formed by relatively narrow or tenuous connection, or may be held in position relative to the strip after being completely severed therefrom by means of frictional engagement with the edges after the stamping, shaping, piercing and bending operations are completed, and in such a manner as to allow the link members to be carried along by the strip or the waste material portion of the strip into position to be successively removed from the strip or the waste portion of the strip and linked together in a suitable manner, as by mechanism similar to that shown in Figs. 14 to 17 of the drawings, and the final separation of each link from the strip or the waste portion thereof may be effected at substantially the same time as the linking operation.

While the stamping, shaping, piercing, bending and forming operations have been shown and described as arranged in a certain definite order for the sake of simplicity in showing and describing the same, it is to be understood that these operating steps may be varied as desired in the order of their occurrence in forming and shaping the link members, that these steps may be carried out by manual means or with mechanically operated elements, and that certain of the steps may be combined for effectuation by a single tool, when found desirable, without departing from the spirit and scope of the invention.

While the link members have been shown and described as formed with the tongue and slot portions located in opposed relation transversely of the metal strip, they may be formed with the tongue and slot portions opposed to each other in a direction longitudinally of the strip, if desired, in which case the linking operation may be carried out with the completed chain traveling in the same direction as the preformed metal strip, instead of transversely thereof as shown herein, that is, the movement of the completed chain following the linking operation may be in the same direction or at substantially right angles to the direction of movement of the metal strip carrying the formed link, dependent upon the arrangement of the formed links relative to the metal strip.

What we claim is:—

1. In a process for making a continuous chain structure from sheet metal stock, the steps of shaping the links from a sheet metal strip and forming a single longitudinally extending closed slot in one edge of each link and a narrowed tongue upon the opposite side edge of each link through a continuous series of operating steps while adjacent links are supported by portions of the metal strip.

2. The process of making a chain structure from a sheet metal strip which comprises, progressively shaping a plurality of links from the sheet metal strip by a series of shaping operations to form a closed slot in one edge of each link and a narrowed tongue upon that side of each link opposite to said slot while the links are supported by portions of the metal strip.

3. In a process for making a continuous chain structure from sheet metal stock, the steps of shaping a plurality of links from a sheet metal strip to form a slot in one edge of each link and a tongue of less width than the body portion of said link upon that side of the link body opposite to the slot while adjacent links are supported by portions of the metal strip, separating the links from the metal strip successively, and connecting successively separated links by threading the tongue of the link last separated from the strip through the slot in the link next previously separated from the strip through horizontal and vertical movement of the link last separated from the strip and the previously separated link relative to each other.

4. In a process for making a continuous chain structure from sheet metal stock, the steps of shaping the links from a continuous sheet metal strip and forming a slot in one edge of each link and a tongue of less width than said link in the opposite edge thereof while adjacent links are supported by portions of the metal strip, separating the links from said metal strip successively, and connecting successively separated links by passing the tongue of the link last separated from the strip through the slot in the previously separated link through a definite series of successive operating steps.

5. In a process for making a continuous chain structure from sheet metal stock, the steps of shaping the links from a sheet metal strip and forming a slot in one edge of each link and a tongue in the opposite edge of each link while adjacent links are supported by a portion of the metal strip, separating the links from the strip successively, connecting successively separated links by passing the tongue of the link last separated from the strip through the slot in the previously separated link through horizontal and vertical movement of the links relative to each other, and bending the tongue portion of the link last separated from the stock which has been passed through the slot back upon itself to bring a part thereof into substantial engagement with the main body portion of the link.

6. In a process for making a continuous chain structure from sheet metal stock, the steps of shaping the links successively from a sheet metal strip to form a narrowed portion and a slot upon opposite sides of the main body portion of each link while adjacent links are supported by portions of the stock, separating the links from the stock successively in the order of their occurrence, and connecting the links together by inserting the narrowed portion of the link last separated from the stock through the slot in the previously separated link.

7. The process of making a chain structure from a sheet metal strip by a continuous series of operating steps which comprises, shaping a plurality of links from a sheet metal strip to form link members each of which is provided with a slot located adjacent to one edge thereof and has a tongue portion of less width than the main body portion of the link extending from that side of the link member opposite the slot while the several links are supported by portions of the metal strip, forming spaced bends in the tongue portion of each link while the links are supported by portions of the metal strip, separating the links from the metal strip successively, inserting the bent tongue portion of each link within the slot in the previously separated link, and forcing a part of the tongue portion of each link into contact with the main body portion of the link by further bending of the tongue portion along the line of one of the previously formed bends.

8. The process of making a chain structure from a sheet metal strip through a continuous series of operating steps which comprises, shaping the metal strip to form a plurality of links connected together by portions of the strip and each comprising a body portion provided with a slot and a tongue portion of less width than said body portion, said tongue and slot being located upon opposite sides of the body portion, forming successive bends in the tongue portion, and connecting the links together by inserting the tongue portion of each link within the slot formed in an adjacent link and further bending the tongue portion to bring a part thereof into substantial engagement with a part of the body portion of the link.

9. In a process for making an articulated chain structure from a sheet metal strip through a continuous series of successive operating steps which comprise, the steps of treating the metal strip to form successive links each provided with a slot and a narrow tongue located upon opposite sides of the main body portion of the link while the links are supported by portions of the metal strip, forming spaced parallel bends in the tongue portion of each link, successively separating the links from the sheet metal strip and then passing the tongue portion of each of said links through the slot in the link previously separated from the strip, and further bending the tongue portion of each link substantially along the line of one of the previously formed bends immediately following the insertion of the tongue in the slot of the previously formed link to secure the links together.

10. In a process for making a continuous chain structure through a continuous series of associated operating steps, the steps of progressively shaping a sheet metal strip to form a plurality of similarly shaped links, successively separating said formed links from the strip, and connecting the links together after their separation from the strip by passing a portion of each link through an opening in the link previously separated from the strip through relative movement of the links in a direction transversely of the plane of the strip and bending the portion inserted in the opening back upon itself.

11. In a process for making a continuous chain structure from sheet metal stock, the steps of shaping the links from a sheet metal strip to form a narrowed portion and a slot upon opposite sides of each link and bending a part of the narrowed portion into a plane at substantially right angles to the plane of the main body portion of the link while the several links are connected together by portions of the metal strip, successively separating the partially formed links from the metal strip and connecting the links in the order of their separation from the strip by passing the narrowed portion of each link through the slot formed in the link next adjacent thereto and bending over the narrowed portion of each link after insertion within the slot to form the chain structure.

12. In a process for making a continuous chain structure from sheet metal stock, the steps of shaping a sheet metal strip during intermittent movement of the strip to form a plurality of links while the several links are supported by portions of the strip, each link being provided with a tongue and slot oppositely positioned relative to the body portion of the link, connecting the several links by passing the tongue of each link through the slot in the link next adjacent thereto, and bending a portion of the tongue into position to hold the links against separation by a series of interconnected operating steps.

13. In a process for making a chain structure by subjecting a sheet metal strip to a continuous series of interrelated operating steps while advancing the metal strip in the direction of its length which comprises the steps of shaping the links from the narrow sheet metal strip to form each link with an oppositely positioned tongue and slot while the several links are supported by the sheet metal strip and held in a definite and uniform relationship thereto, advancing the strip intermittently, and operating upon each link successively to pass the tongue portion thereof through the slot in the link next adjacent thereto and to bend a portion of the tongue into position to hold the links against separation.

14. In a process for making a chain structure by subjecting a sheet metal strip to a continuous series of interrelated operating steps while advancing the metal strip in the direction of its length, the steps of shaping a plurality of links from sheet metal to form a tongue and slot upon opposite sides of the body portion of each link, partially bending the tongue portion of each link, inserting the partially bent tongue of each link in the slot of an adjacent link, and then completing the bending operation to bring the free end of the tongue into substantial engagement with the body portion of the link.

15. In a process for making a chain structure by subjecting a sheet metal strip to a continuous series of associated operating steps while advancing the metal strip in the direction of its length, the steps of shaping the links from the strip while the links are supported by portions of the strip, successively separating the links from the strip, and connecting the separated links together by an interrelated series of linking and bending operations.

16. The process of making a chain structure by subjecting a metal strip to a series of successive operating steps while advancing the strip in the direction of its length which comprises, forming a plurality of links each of which is provided with a tongue projecting outwardly from one side of the link and has a closed slot located upon that side of the main body portion of the link opposite to said tongue, inserting the tongue of each link through the slot of the link next adjacent thereto, and bending over a portion of the tongue to connect the links together.

17. In a process for making a chain structure from a sheet metal strip through a continuous series of shaping and linking operations, the steps of advancing the sheet metal strip intermittently in the direction of its length, shaping the strip to form a plurality of link members each provided with a slot and tongue located upon opposite sides of the body portion of the link, forming successive bends in the tongue portion, separating the links from the strip successively, inserting the tongue portion of the link last separated from the strip through the slot of the previously separated link, and further bending the tongue portion along the line of one of the previously formed bends to bring a part thereof into substantial engagement with a portion of the previously formed link body.

18. The process of making a chain structure from a sheet metal strip which has been previously shaped to form a plurality of links supported by portions of the strip and each provided with a tongue and slot located upon opposite sides of the body portion of the link, which comprises, advancing the preformed strip in the direction of its length, separating the links from the strip successively, and interconnecting adjacent links together after their separation from the strip by passing the tongue of each link through the slot in the link next adjacent thereto by relative movement of the links in a direction transversely of the plane of movement of the strip.

19. The process of making a chain structure from a sheet metal strip which has been previously shaped to form a plurality of links supported by portions of the strip and each provided with a tongue and slot located upon opposite sides of the body portion of the link, which comprises, advancing the preformed strip in the direction of its length, separating the links from the strip successively, and interconnecting adjacent links together after their separation from the strip by passing the tongue of each link through the slot in the link next adjacent thereto by relative bodily movement of the links in a direction transversely of the plane of the strip, and bending over a portion of the tongue after its insertion within the slot while the adjacent links are held in interconnected relation with each other.

KARL FASSNACHT.
EMIL MUELLER.